United States Patent
Baumgartinger et al.

(10) Patent No.: US 9,269,254 B2
(45) Date of Patent: Feb. 23, 2016

(54) SIGNALLING DEVICE FOR DIVERS

(71) Applicant: Rainer Baumgartinger, Weyregg (AT)

(72) Inventors: Rainer Baumgartinger, Weyregg (AT); Karl Haslinger, Voecklabruck (AT); Bernhard Rothbucher, Salzburg (AT); Matthias Roher, Linz (AT)

(73) Assignee: RAINER BAUMGARTINGER, Weyregg (AT)

( * ) Notice: Subject to any disclaimer, the term of this patent is extended or adjusted under 35 U.S.C. 154(b) by 0 days.

(21) Appl. No.: 14/394,316

(22) PCT Filed: Apr. 17, 2013

(86) PCT No.: PCT/AT2013/050091
§ 371 (c)(1),
(2) Date: Oct. 14, 2014

(87) PCT Pub. No.: WO2013/155546
PCT Pub. Date: Oct. 24, 2013

(65) Prior Publication Data
US 2015/0070173 A1    Mar. 12, 2015

(30) Foreign Application Priority Data
Apr. 20, 2012   (AT) .................................. A 487/2012

(51) Int. Cl.
| | | |
|---|---|---|
| G08B 23/00 | (2006.01) | |
| G08B 21/18 | (2006.01) | |
| B63C 9/20 | (2006.01) | |
| B63C 11/26 | (2006.01) | |
| H04B 11/00 | (2006.01) | |

(52) U.S. Cl.
CPC ................ *G08B 21/182* (2013.01); *B63C 9/20* (2013.01); *B63C 11/26* (2013.01); *H04B 11/00* (2013.01)

(58) Field of Classification Search
None
See application file for complete search history.

(56) References Cited

U.S. PATENT DOCUMENTS

| | | | |
|---|---|---|---|
| 4,599,965 A | * | 7/1986 | Johnson .................. B63C 11/26  116/173 |
| 4,779,554 A | | 10/1988 | Courtney |

(Continued)

FOREIGN PATENT DOCUMENTS

| | | |
|---|---|---|
| DE | 10012986 A | 9/2001 |
| GB | 2449495 A | 11/2008 |

*Primary Examiner* — Ojiako Nwugo
(74) *Attorney, Agent, or Firm* — Andrew Wilford

(57) ABSTRACT

A signalling device for divers (3) has, along a shoulder strap (4) for compressed air bottles, a clip (12) which is pivotably attached in the shoulder region to the shoulder strap (4) and is detachably connected at the other free end to the shoulder strap (4) by means of a closure (13, 13'). The closure (13, 13') can be opened manually or opens automatically when an alarm is triggered, for example when a limiting value which is set on a diving computer is exceeded. The clip (12) then floats above the shoulder in the manner of a torch which is held upright, especially since the clip (12) has a signal light (14) as an all-round light at the free end. An antenna (21) of an ultrasonic transmitter (20) can be provided on the clip (12), and if appropriate also a GPS transmitter (22) or transponder which makes it easier to locate the diver (3) above the water. A hose (10) leading to a compressed air bottle (9) is clamped in between the clip (12) and the shoulder strap (4), which hose (10) has a reserve mouthpiece (11). This alternative supply of breathing air is released when the clip (12) is opened.

7 Claims, 1 Drawing Sheet

(56) References Cited

U.S. PATENT DOCUMENTS

| | | | | |
|---|---|---|---|---|
| 5,022,790 A * | 6/1991 | Stevenson | B63C 11/26 | 116/142 FP |
| 5,516,233 A * | 5/1996 | Courtney | B63C 9/1255 | 405/186 |
| 5,855,454 A * | 1/1999 | Courtney | B63C 9/1055 | 405/186 |
| 6,203,246 B1 * | 3/2001 | Courtney | B63C 9/1255 | 405/185 |
| 6,527,479 B1 * | 3/2003 | Courtney | B63C 9/1255 | 405/185 |
| 6,527,480 B2 * | 3/2003 | Angelini | B63C 11/30 | 405/186 |
| 6,558,082 B1 * | 5/2003 | Courtney | B63C 9/1055 | 116/26 |
| 6,666,622 B1 * | 12/2003 | Courtney | B63C 9/08 | 405/186 |
| 7,612,686 B1 | 11/2009 | Bustamante | | |
| 2003/0115010 A1 * | 6/2003 | Estep | B63C 11/12 | 702/127 |
| 2004/0022129 A1 * | 2/2004 | McGeever, Jr. | B63C 11/26 | 367/128 |
| 2004/0157514 A1 * | 8/2004 | Courtney | B63C 9/20 | 441/88 |
| 2007/0076527 A1 | 4/2007 | Romano | | |
| 2010/0183373 A1 * | 7/2010 | Stood | B63C 11/2245 | 405/186 |

* cited by examiner

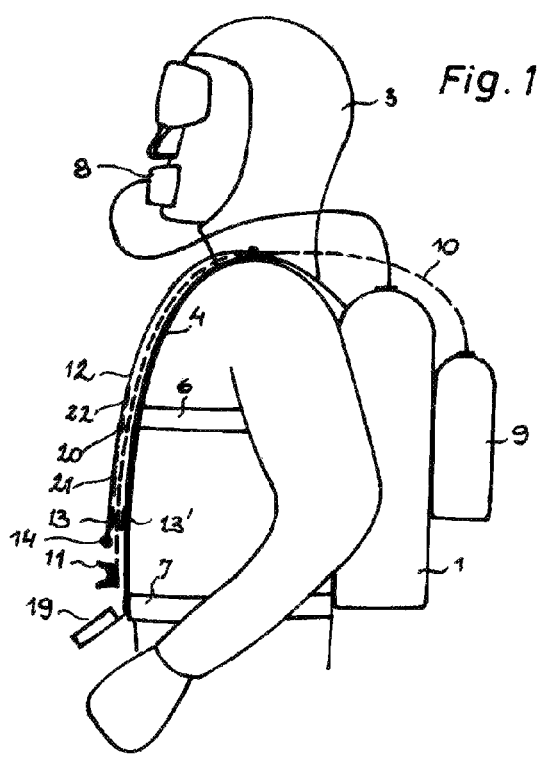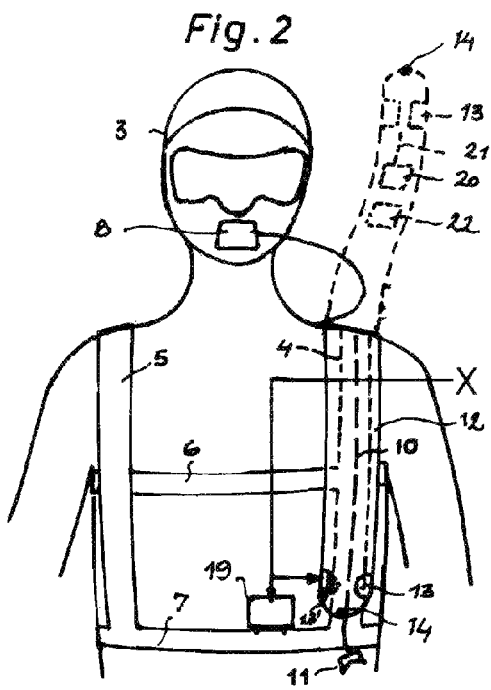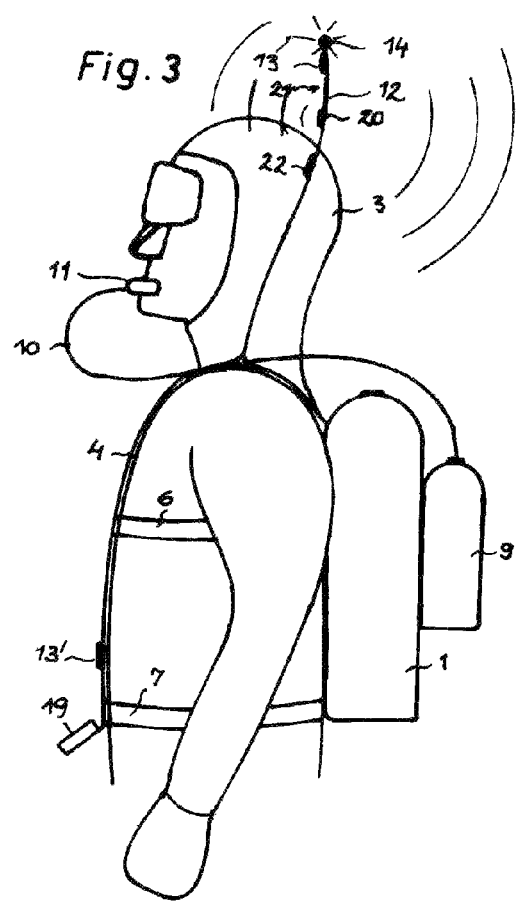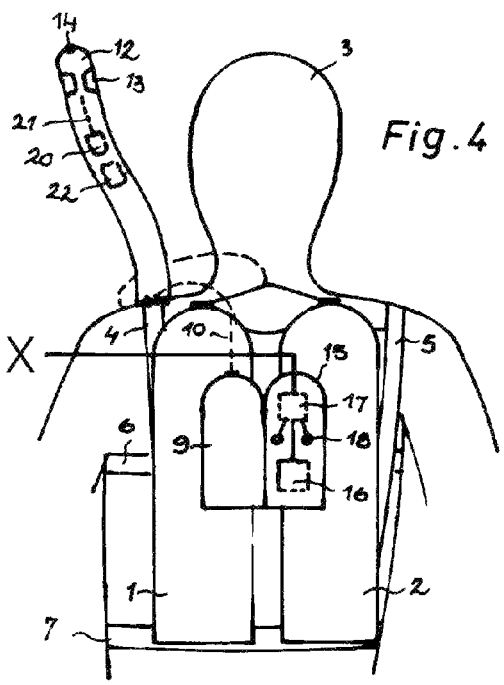

SIGNALLING DEVICE FOR DIVERS

CROSS REFERENCE TO RELATED APPLICATIONS

This application is the U.S.-national stage of PCT application PCT/AT2013/050091 filed 17 Apr. 2013 and claiming the priority of Austrian patent application A487/2012 itself filed 20Apr. 2012.

The invention relates to a signaling device for a diver, comprising a compressed-air supply level display or consumption display for breathable air, a diving depth display, preferably, a dive-duration display, as well as a circuit for triggering an alarm, for example a light signal when at least one preset threshold value has been reached or exceeded.

Both sport diving and professional diving are activities that entail risk. This is why extensive training is required. Aside from managing the equipment, including in stressful situations, other influencing factors from the unfamiliar environment must be taken into account, as well as the diver's own conditioning and state of health. At first, diving watches for displaying the diving duration coordinated with the supply level of compressed air, and also a depth gauge were the only devices that the diver took down on a dive. Communication was maintained between divers by hand signals. Today, diving computers comprising alarm devices and automatic rescue systems are in wide use that enable a controlled ascent or life-saving emergency ascent as required with an airbag, often acting automatically.

In addition to these, of course, there is also underwater communication using ultrasound, including the use of receiver buoys at the surface of the water that convert the signals to terrestrial communication frequencies and if necessary transmit GPS coordinates along with distress calls. Since mouthpieces, connecting hoses and compressed-air tanks cause many of the problems, a very common approach is to carry a small supplemental compressed-air tank with hose and mouthpiece during a dive, thereby providing sufficient air to effect a controlled ascent within the required time window as a function of the depth if the primary air supply happens to fail.

U.S. Pat. No. 7,612,686, discloses an underwater emergency device that is of modular design and transmits signals that notify accompanying divers about an emergency situation. The signals can also, for example, be relayed through relay links and transmitted to other devices in a rescue sequence. In addition, one part of the device can be disconnected. It can ascend to the surface where it displays the parameters needed to rescue a diver under water who, for example, has been prevented from ascending.

GB 2,449,495 relates to a rescue device particularly for a diver and that provides for a controlled ascent. When activated, a safety bracket located above an inflatable float unit carried on the back swings over the head of the diver. This both protects the head but also enables assisting persons to come to the aid of the diver in the emergency situation and provide the appropriate assistance. A signal lamp is also attached to the safety bracket. US 2007/076,527, describes a marine distress signaling device that comprises a watertight housing including battery and light source, as well as a transmitter and telescoping antenna with signal flag. DE 100 12 986, is based on a manually operable transmitter that transmits both optical and acoustic signals when removed from a retainer on the diving suit.

The object of the invention is to provide as part of a diving safety system a signaling device that can be optically activated as a function of real-time data and nominal data of a diving computer, and that also makes an emergency situation clearly visible to the surrounding environment in response to a continuous alarm.

This is achieved by a signaling device of the above-described type where an elongated flap extends from the shoulder region toward the belt region along a compressed-air-tank shoulder strap, at least partially covering this strap, the elongated flap being flexibly connected at the shoulder region and provided at the free end with a releasable fastener that secures the elongated flap parallel to the shoulder strap directly thereon or on a tab of the shoulder strap, and that can be released by hand or automatically in response to an alarm whenever one of the preset threshold values is met or exceeded, so as to release, swing upward, or float the elongated flap, the elongated flap supporting at the free end a signal lamp that can be switched on when the fastener is opened or in response to an alarm. This elongated flap thus initially lies almost invisibly on the body above one of the air tank shoulder straps. The signal lamp is located at the lower end. In the simplest case, the diver him/herself can release the fastener at the lower end of the elongated flap, including, for example for nontechnical reasons (that is, when no threshold values have been exceeded). The elongated flap rises so that the signal lamp is positioned above the head of the diver. A float is provided at the fastening-device end of the elongated flap, the lamp itself already functioning as the float.

Opening or releasing the fastener enables the signal lamp to be energized. An incandescent lamp or high-intensity LEDs flash or illuminate in a signaling color, the lamp being visible in all directions like on an emergency vehicle. A rotating light can also be implemented electronically by LEDs. If a diving computer is present and threshold values have been set, initially a first alarm is effected by illuminating the signal lamp at the adjacent elongated flap (for example yellow signal light) after a preset threshold value has been exceeded. If the diver does not react and the threshold value continues to be exceeded, the fastener is opened by a switching pulse from the electronics. The entire extent of the signaling device is activated by swinging upward and the lamp emits a red light. The signaling device in this case functions automatically. Since the elongated flap when activated projects upward, it is completely unobstructed and visible. The is invention provides an approach whereby an antenna is provided in or on the elongated flap, in particular for an ultrasound-based transmitter for underwater wireless communication of information. The upwardly projecting elongated flap is thus optimal not only for the signal lamp but also for transmitting from the antenna. The diving buddy receives a signal from the ultrasound transmitter such that his/her signal lamp is caused, for example, to turn green. This clearly indicates that he/she is not him/herself experiencing any problem but that his/her diving buddy is in an emergency situation.

It is furthermore advantageous for a position transmitter or transponder to be provided in or on the elongated flap, preferably, in the region of the free end of the elongated flap, which transmitter/transponder includes a transmitting/receiving antenna that is optionally routed along the elongated flap so as to enhance the performance of the antenna. This transmitter functions only after surfacing and broadcasts a location signal together with the coordinates, for example using GPS.

Another embodiment of the invention is characterized in that the fastener is a magnetic fastener that can be released electrically in response to an alarm signal, and that the ultrasound transmitter, and optionally the position transmitter or transponder, can be switched on in response to the signal to open the fastener or on manual opening of the fastener. In the case of a simple embodiment without automatic function, the fastener can be an ordinary hook-and-loop fastener. In the case of automatic functionality, a latch can be used that includes an electro-mechanically retractable latching pin. A magnetic latch has proven to be advantageous here in which it is possible to turn off the retaining force, for example, by superimposing an external field, and in any case effecting a repelling action. After the fastener is opened, it can be advantageous to push off the elongated flap by a supplemental force, for example a spring force, that is, not simply by means of buoyancy forces, but to move it in a precise and forced manner into an upward-swung position and hold it there. In order to reliably protect the electronics and the power supply, it is advantageous if the circuit for triggering the alarm and including sensors for the diving depth as well as an electrical power source are provided inside a watertight housing, for example, in the form of a compressed-air tank, and a display is provided within view of the diver on a strap close to the free end of the elongated flap.

A distinguishing feature of the invention consists in the fact that a connector hose provided underneath the elongated flap between a compressed-air tank and an auxiliary mouthpiece is partially covered by the elongated flap, is secured parallel to the shoulder strap, and is released for use when the elongated flap is swung upward. For example, if the elongated flap is released automatically, that is, the fastener is opened, the elongated flap lifts off and rises so as to improve the visibility of the signal light but also to ensure better signal transmission. In addition, the elongated flap after being activated releases the air hose of the connector hose, thereby allowing the diver to reach the auxiliary mouthpiece at the free end of the hose if the primary air supply fails.

An embodiment of the invention is shown in the drawing in which:

FIG. 1 is a side view of a diver with diving gear including the signaling device according to the invention before it is activated;

FIG. 2 shows the diver of FIG. 1 from the front;

FIG. 3 shows the diver of FIG. 1 with the signaling device after it has been activated; and FIG. 4 is a rear view of the diver of FIG. 3.

In FIGS. 1 through 4, two compressed-air tanks 1, 2 providing the primary air supply are carried by a diver 3 by shoulder straps 4, 5, a chest belt 6, and a waist belt 7. A solid line indicates the connector hose to a mouthpiece 8. No pressure-reducing devices or regulators for the air are shown. As the figures show, an additional compressed-air tank 9 is provided that includes an auxiliary air supply for ascending as well as an auxiliary mouthpiece 11 on a connector hose 10.

An elongated flap 12 routed along the shoulder strap 4 is connected at the top to the strap 4 in the region of the shoulder and at the bottom free end includes a fastener 13, 13' that retains that the flap 12 is normally parallel to the strap 4 and terminating in the vicinity of the belt 7. At its end with the fastener this flap 12 carries a signal lamp 14 that uses, for example a reed contact to turn on a brilliant LED after the fastener has been opened. This LED can transmit different messages by changing color (yellow: alarm 1, red: alarm 2, green: signal with the diving buddy). Opening the fastener 13, 13' can be done either by hand or automatically. To this end the fastener 13, 13' is provided, for example, in the form of a magnetic catch. In this embodiment a watertight housing 15 in the form of a compressed-air tank hold a battery 16 and an electronic circuit 17 to record data from various sensors 18, such as the pressure for the diving depth or the tank fill level in order to measure the air supply and calculate the usage time. The circuit also includes a clock and can be adjusted via a display 19. This adjustability also relates to threshold values for the planned diving depth, dive duration, and air management. All those parameters relevant and important for a dive are shown by the display 19 that is connected to the circuit 17 (connection shown schematically in FIG. 2 and FIG. 4, the point identified by X indicating the connection point of the connecting path between FIG. 2 and FIG. 4). Whenever a parameter (for example diving depth) is exceeded, the display 19 becomes visibly noticeable, and indicates this condition by flashing. The signal lamp 14 at the end of the flap 12 also issues an alert by shining yellow, red, green. Whenever the sensor 18 for the diving depth indicates that the threshold value preset by the diver has again been exceeded or continues to be exceeded, a signal is sent by the circuit 17 to the fastener 13, 13'. This fastener is opened either by a superimposed magnetic field or by other means, with the result that the flap 12 floats upward, as shown in FIG. 3 and FIG. 4. Separation from its pad surface on the strap 4 or a pad on the strap 4 also causes the lamp 14 to illuminate.

An ultrasound transmitter 20 (using the 15 kHz range) in the flap 12 or in the housing 15 is activated by the signal to open the fastener 13, 13' or to switch on the lamp 14, and broadcasts a radio signal through an optimally positioned antenna 21, for example for the diving instructor or diving buddy, thereby enabling them to assist as necessary. As mentioned above, the LEDs of the diving instructor or diving buddy then glow green.

The flap 12 in the normal situation covers the hose 10 of the compressed-air tank 9 and secures it tightly against the strap 4 or a shoulder strap pad. Whenever the emergency situation arises and the flap 12 is released, that is, the fastener 13, 13' is opened, this emergency air supply also becomes available. The auxiliary mouthpiece 11 can be grasped and used as illustrated in FIG. 3. This then allows for a controlled ascent.

The released flap 12 after surfacing floats on the surface of the water. This provides terrestrial radio communication through worldwide position-locating systems. A GPS position transmitter 22 or transponder begins to operate and facilitates the search for the diver.

The invention is available in different configurations and is extremely useful as an aid to diving instruction. It enables the diving instructor to recognize immediately when students are in trouble, and it provides security to the diver since the diving buddies are notified immediately about any emergency situation requiring assistance, or a rescue sequence is set in motion. In the simplest case, manual activation could be effected by opening the fastener. If the signal lamp comes from the region of a magnet on the shoulder strap relative to the signal lamp, a reed contact is closed and switches on the omnidirectional light (lamp 14). The procedure is effected automatically in the next step when a diving computer is used. Similarly, the expanded configuration using the ultrasound alarm warning under water, and finally, the release of a secondary air supply linked to releasing the flap 12 are another option for a modular upgrade of a base version of the signaling device. The electronics of the signaling device can also actively interact with an existing buoyancy compensator to control the diving depth, and thus be used to rescue the victim of the accident.

The invention claimed is:
1. A signaling device for a diver having a harness carrying a compressed-air supply, the device comprising:
a compressed-air supply level or consumption display for breathable air,
a diving depth or duration display, a circuit for issuing an alarm signal and triggering an alarm when at least one preset threshold value relating to the compressed-air supply, or the dive depth or duration has be reached or exceeded, an elongated flap extending from a shoulder region of the harness toward a free end of the strap at a belt region of the harness along a shoulder strap of the harness and at least partially covering this strap, the elongated flap being flexibly connected at the shoulder region to the harness, means for floating at the free end of the elongated flap, a fastener at the free end releasably securing the free end of the elongated flap at the belt region with the flap extending parallel to the shoulder strap directly and releasable by hand or automatically in response to the alarm signal of the control circuit whenever one of the preset threshold values is met or exceeded, so as to release the elongated flap to swing upward, and, a signal lamp at the free end that switches on when the fastener is opened or in response to the alarm signal.

2. The signaling device according to claim 1, further comprising:

an antenna and an ultrasound transmitter on the elongated flap triggerable by the circuit for wireless underwater communication.

3. The signaling device according to claim 2, further comprising:

a position transmitter or transponder in or on the elongated flap at the free end of the elongated flap, the position transmitter or transponder extending along the elongated flap to improve the performance of the antenna.

4. The signaling device according to claim 1, further comprising:

an auxiliary compressed-air tank, an auxiliary mouthpiece, and a connector hose underneath the elongated flap between the auxiliary compressed-air tank and the auxiliary mouthpiece, the connector hose being partially covered by the elongated flap and secured parallel to the shoulder strap when the fastener is closed and being released for use when the fastener is opened and the elongated flap swings upward.

5. The signaling device according to claim 3, wherein the fastener is a magnetic latch that can be electrically activated in response to the alarm signal, and the position transmitter can be switched on in response to a signal to open the fastener or on manual opening of the fastener.

6. The signaling device according to claim 1, further comprising:

sensors for diving depth;

an electrical power source for the circuit; and a watertight housing holding the sensors, the power source, and the circuit for triggering an alarm; and a display within view of the diver on a strap close to the free end of the elongated flap.

7. The signaling device according to claim 1 wherein the lamp forms the means for floating.

\* \* \* \* \*